United States Patent
Furuyama et al.

(10) Patent No.: US 7,192,199 B2
(45) Date of Patent: Mar. 20, 2007

(54) OPTICAL SEMICONDUCTOR MODULE AND METHOD OF MANUFACTURING THE SAME

(75) Inventors: Hideto Furuyama, Yokohama (JP); Hiroshi Hamasaki, Hiratsuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/012,273

(22) Filed: Dec. 16, 2004

(65) Prior Publication Data
US 2005/0141824 A1 Jun. 30, 2005

(30) Foreign Application Priority Data
Dec. 26, 2003 (JP) ............... 2003-432231
Dec. 26, 2003 (JP) ............... 2003-432232

(51) Int. Cl.
*G02B 6/36* (2006.01)
(52) U.S. Cl. ............... 385/89; 385/53; 385/88
(58) Field of Classification Search ............... 385/53, 385/88, 89
See application file for complete search history.

(56) References Cited

U.S. PATENT DOCUMENTS 6,530,698 B1 * 3/2003 Kuhara et al. ............... 385/88

2003/0081911 A1  5/2003  Ide et al.
2005/0141824 A1  6/2005  Furuyama et al.

FOREIGN PATENT DOCUMENTS

| CN | 1293375 A | 5/2001 |
| DE | 35 08 627 A1 | 9/1986 |
| JP | 6-237016 | 8/1994 |
| JP | 10-31138 | 2/1998 |
| JP | 2000-241653 | 9/2000 |
| JP | 2000-347072 | 12/2000 |
| JP | 2001-127312 | 5/2001 |
| JP | 2001-159724 | 6/2001 |
| JP | 2003-131066 | 5/2003 |

OTHER PUBLICATIONS

U.S. Appl. No. 11/472,367 filed Jun. 22, 2006, Hamasaki et al.

* cited by examiner

*Primary Examiner*—Jennifer Doan
(74) *Attorney, Agent, or Firm*—Oblon, Spivak, McClelland, Maier & Neustadt, P.C.

(57) ABSTRACT

In an optical semiconductor module, a transparent resin spacer is interposed between an optical guide and a semiconductor device. As a result, the optical semiconductor module is formed of the minimum required members so as to suppress the influence given by the reflected light. Also, the optical semiconductor module can be manufactured without employing the manufacturing step of a high cost.

12 Claims, 7 Drawing Sheets

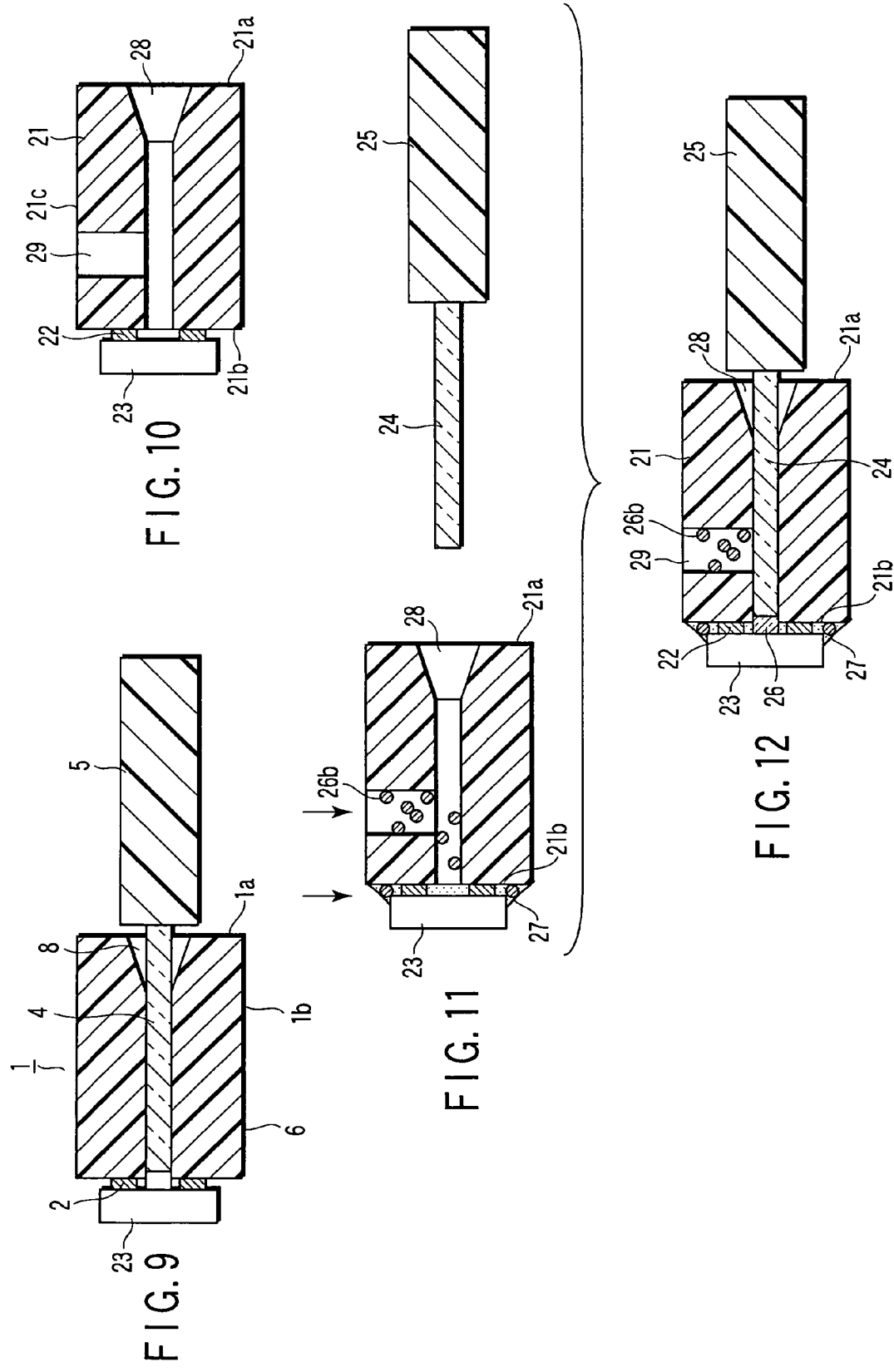

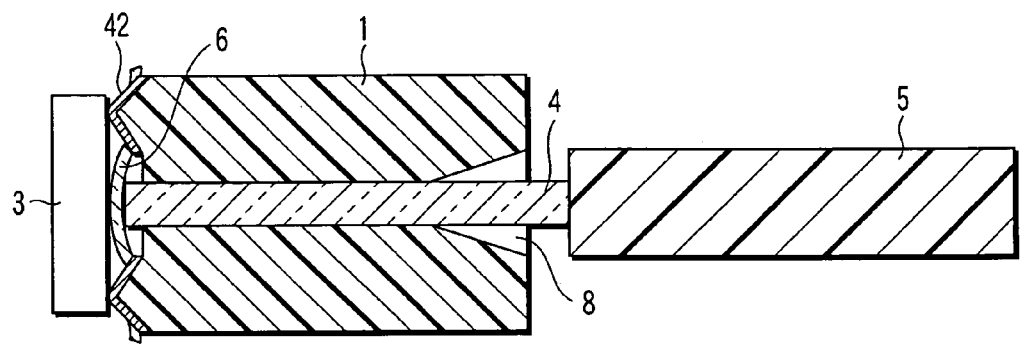
F I G. 20
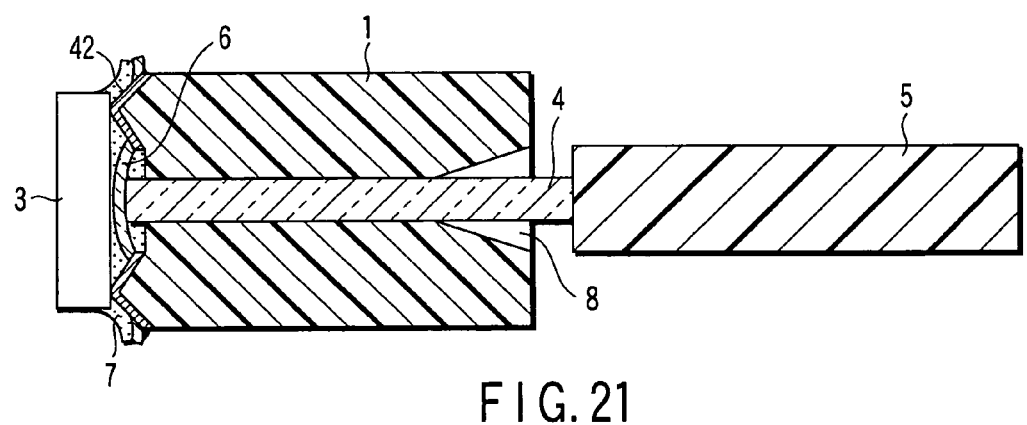
F I G. 21

OPTICAL SEMICONDUCTOR MODULE AND METHOD OF MANUFACTURING THE SAME

CROSS-REFERENCE TO RELATED APPLICATIONS

This application is based upon and claims the benefit of priority from prior Japanese Patent Applications No. 2003-432231, filed Dec. 26, 2003; and No. 2003-432232, filed Dec. 26, 2003, the entire contents of both of which are incorporated herein by reference.

BACKGROUND OF THE INVENTION

1. Field of the Invention

The present invention relates to an optical semiconductor module and a method of manufacturing the same, particularly, to an optical semiconductor module adapted for the light transmission over a short distance and capable of realizing a stable optical coupling with a relatively simple structure.

2. Description of the Related Art

A drastic improvement in the operating speed has been achieved in the large scale integrated circuit because of the improvement in the performance of the electronic device such as a bipolar transistor or a field effect transistor. However, even if the operating speed inside the LSI has been achieved, the operating speed on the level of the printed circuit board to which the LSI is mounted is suppressed to a level lower than that inside the LSI, and the operating speed is further lowered on the rack level with the printed circuit board involved therein. The suppressed operating speed is derived from the transmission loss of the electric wiring accompanying the elevation of the operating frequency and from the increases in noise and in the electromagnetic interference. It is unavoidable for the operating speed to be suppressed to a low level because, in order to ensure the signal quality, the operating frequency is suppressed to a low level with increase in the length of the wiring. It follows that, in the electric wiring apparatus, the tendency that the mounting technology rather than the operating speed of the LSI controls the operating speed of the system is rendered stronger and stronger in recent years.

In view of the problems noted above in conjunction with the electric wiring apparatus, several optical wiring apparatuses for optically coupling different LSI s have been proposed as disclosed in, for example, Japanese Patent Disclosure (Kokai) No. 2000-347072. The optical wiring is scarcely dependent on the frequency in respect of, for example, the loss in the DC region and the AC region having the frequency exceeding 100 GHz, and the wiring path is substantially free from the electromagnetic interference or the electrical ground potential fluctuating noise. Such being the situation, it is possible to achieve easily the wiring of scores of Gbps. In order to realize the optical wiring of this kind between different LSI s, required is an optical semiconductor module having a simplified construction as disclosed in, for example, Japanese Patent Disclosure No. 2000-347072 quoted above. Also, a large number of optical transmission paths are required as the LSI wiring, and it is necessary for the optical semiconductor module to be manufactured at a very low cost.

In general, an image-forming lens, etc. are incorporated in an optical semiconductor module, and an optical guide coupling section has a connector structure. Such being the situation, it is difficult to miniaturize sufficiently the optical semiconductor module in many cases. On the other hand, in the optical semiconductor module disclosed in Japanese Patent Disclosure No. 2000-347072 quoted above, an optical transmission path such as an optical guide is coupled directly with a semiconductor device so as to form an integral structure. As a result, the miniaturization can be achieved relatively easily. However, the particular construction gives rise to several problems as pointed out below.

Specifically, in the optical semiconductor module disclosed in Japanese Patent Disclosure No. 2000-347072, an optical guide and the holding member thereof are formed integral, and a pattern electrode is formed on the holding member for mounting a semiconductor device to the integral structure noted above. It follows that it is necessary to perform the pattern depiction or the pattern transfer of the electrode in a very small edge section of the optical guide holding member. To be more specific, it is necessary to carry out the patterning having an accuracy of several microns under the state that a guide of several meters to scores of meters is kept mounted. It is practically difficult to manufacture the optical semiconductor module by this manufacturing method. However, it is absolutely necessary to employ the particular method in the case of employing at least an arrayed semiconductor device. It follows that it is substantially impossible to manufacture the optical semiconductor module on a mass production basis by the particular manufacturing method. Alternatively, in the case of employing the particular manufacturing method, the product yield is very low.

It should also be noted that, in the optical semiconductor module disclosed in Japanese Patent Disclosure No. 2000-347072 quoted above, the edge surface of the optical guide and the plane to which is mounted the semiconductor device are substantially on the same plane, with the result that the optical guide and the semiconductor device are positioned very close to each other so as to be coupled with each other. However, the surface emitting laser, which is a typical high speed optical signal source, is sensitive to the reflected light, i.e., the laser light emitted from the surface-emitting laser itself and reflected so as to be brought back to the surface-emitting laser. In other words, the reflected light from the optical fiber coupling section (near end reflection) is inherent in the surface-emitting laser. It follows that it is important to take measures against the reflected light at, for example, the light-emitting plane of the optical guide (far end reflection) in the optical semiconductor module disclosed in Japanese Patent Disclosure No. 2000-347072. The method of using an optical isolator provides the most reliable measure against the problem noted above. However, the optical isolator is highly costly. In addition, an additional problem is generated that the space for incorporating the optical isolator renders the module markedly bulky.

As another measure, it is conceivable to apply an antireflection coating to the edge surface of the optical guide or to apply an oblique processing to the edge surface of the optical guide. This method is certainly effective as a measure against the reflected light. However, in the prior art such as Japanese Patent Disclosure No. 2000-347072, the optical guide and the holding member are made integral so as to form a pattern electrode for the semiconductor device. As a result, it is also necessary for the no-reflection coating to be formed in a pattern. This requires an accurate pattern formation so as to give rise to the problem in terms of the productivity as in the technology described above.

It is also possible to moderate the influence given by the reflected light by setting appropriately the distance between the surface-emitting layer and the optical guide. To be more specific, if the distance between the surface-emitting laser and the optical guide is extremely long, the optical coupling is simply rendered weak so as to make the optical transmission itself difficult. It should be noted in this connection that, if the distance between the surface-emitting laser and the optical fiber is set appropriately, the optical coupling is certainly rendered low. However, the reflecting light is also diminished. It follows that the influence given by the reflected light can be considerably suppressed while maintaining the capability of the optical transmission.

However, in the optical semiconductor module disclosed in Japanese Patent Disclosure No. 2000-347072 quoted above, it is substantially difficult to control the distance between the semiconductor device and the edge of the optical fiber. Particularly, where the semiconductor device is apart from the edge of the optical fiber by about 100 μm, it is necessary to control the thickness of the spacer or to control the etch back of the optical fiber, with the result that the reproducibility is rendered highly poor.

What is most important is that the edge plane of the optical fiber is formed by the polishing when it comes to the optical semiconductor module disclosed in Japanese Patent Disclosure No. 2000-347072 so as to give rise to the problem that the manufacturing cost in respect of the edge plane of the optical fiber occupies a very high weight. In general, the polishing of the optical fiber including the mounting of the optical fiber to the polishing apparatus, the rough polishing, the intermediate polishing, and the finish polishing necessitates a long processing time exceeding several hours. It follows that the productivity is not improved. In addition, the cost reduction is limited.

BRIEF SUMMARY OF THE INVENTION

An object of the present invention is to provide an optical semiconductor module formed of the minimum required members, which permits suppressing the influence given by the reflected light and which can be manufactured without employing a manufacturing step of a high cost, and a method of manufacturing the particular optical semiconductor module.

According to an aspect of the present invention, there is provided an optical semiconductor module, comprising:

an optical guide having an optical coupling end, the optical guide being configured to guide an optical signal;

an optoelectronic ferrule having a coupling face, provided with electrode pads on the coupling face and a guiding through-hole having an opening on the coupling face, in which the optical guide is inserted;

a semiconductor device arranged to face the coupling face with a gap, and electrically coupled to the electrode pads, the semiconductor device including a light emitting or light detecting section facing to the optical coupling end;

a first resin layer located in the gap between the light emitting or light detecting section and the optical coupling end, the first resin layer optically coupling the light emitting or light detecting section to the optical coupling end; and a second resin layer applied to the gap around the first resin layer.

According to another aspect of the present invention, there is provided an optical semiconductor module, comprising:

optical guides each having an optical coupling end and being configured to guide an optical signal;

an optoelectronic ferrule having a coupling face, provided with electrode pads on the coupling face and guiding through-holes each having an opening on the coupling face, in which the optical guides are inserted, respectively;

a semiconductor device arranged to face the coupling face with a gap, and electrically coupled to the electrode pads, the semiconductor device including light emitting or light detecting sections facing to the optical coupling ends, respectively;

first resin segments each located in the gap between the light emitting or light detecting section and the optical coupling ends, respectively, each of the first resin segments optically coupling the light emitting or light detecting section to the optical coupling end; and a second resin layer applied to the gap around the first resin segments.

According to yet another aspect of the present invention there is provided an optical semiconductor module, comprising:

an optical guide having an optical coupling end, the optical guide being configured to guide an optical signal;

an optoelectronic ferrule having a coupling face, provided with electrode pads on the coupling face and a guiding through-hole having an opening on the coupling face, in which the optical guide is inserted;

a semiconductor device arranged to face the coupling face with a gap, and electrically coupled to the electrode pads, the semiconductor device including a light emitting or light detecting section facing to the optical coupling end;

a granular first resin layer located in the gap between the light emitting or light detecting section and the optical coupling end, the first resin layer optically coupling the light emitting or light detecting section to the optical coupling end; and a second resin layer applied to the gap around the first transparent resin layer.

According to yet another aspect of the present invention there is provided a method of manufacturing an optical semiconductor module, comprising the steps of:

loading a first transparent resin in a groove formed in a tool that is shaped like an optoelectronic ferrule;

inserting an optical guide into a through-hole crossing the first groove and punching the first resin at the tip end of the optical guide;

withdrawing the optical guide having the punched first resin tip mounted to the optical guide from the through-hole; and inserting the optical guide into a guiding through-hole formed in the optoelectronic ferrule so as to permit the optical guide to abut against a semiconductor device mounted on coupling face of the optoelectronic ferrule.

According to further yet another aspect of the present invention, there is provided a method of manufacturing an optical semiconductor module, comprising the steps of:

mixing a solid or semi-solid granular first transparent resin with a liquid second transparent resin, pouring the resultant mixture into a guiding through-hole of an optoelectronic ferrule;

inserting an optical guide into a guiding through-hole of the optoelectronic ferrule so as to bring the mixture into contact with a tip end of the optical guide and with a semiconductor device mounted to an coupling face of the optoelectronic ferrule; and solidifying the second transparent resin.

According to further aspect of the present invention, there is provided a method of manufacturing an optical semiconductor module, comprising:

arranging a transparent resin on a light emitting or light detecting section of a semiconductor device;

mounting a semiconductor device on a coupling face of an optoelectronic ferrule such that the light emitting or light detecting section is aligned with a guiding through-hole of the optoelectronic ferrule;

inserting an optical guide into the guiding through-hole of the optoelectronic ferrule so as to bring the transparent resin into contact with a tip end of the optical guide; and pouring a liquid resin from around the semiconductor device, and solidifying the liquid resin.

According to yet further aspect of the present invention, there is provided an optical semiconductor module, comprising:

an optical guide having an optical coupling end, the optical guide being configured to guide an optical signal;

an optoelectronic ferrule having a coupling face, provided with electrode pads on the coupling face and a guiding through-hole having an opening section on the coupling face, in which the optical guide is inserted;

a semiconductor device arranged to face the coupling face with a gap, and electrically coupled to the electrode pads, the semiconductor device including a light emitting or light detecting section facing to the optical coupling end;

a first resin layer located in the gap between the light emitting or light detecting section and the optical coupling end, the first resin layer optically coupling the light emitting or light detecting section to the optical coupling end; and projecting electrodes fixed on the coupling face, arranged around the opening section, and penetrating the first resin layer to be connected to the semiconductor device; and a second resin loaded in a region around the first resin layer and in a region around the projecting electrodes.

According to another aspect of the present invention, there is provided an optical semiconductor module, comprising:

an optoelectronic ferrule provided with optical transmission paths and a plurality of through holes configured to align the optical transmitting paths having optical input-output faces arranged on a plane, respectively;

a semiconductor device;

a transparent resin film sandwiched between the semiconductor device and the plane so as to separate the semiconductor device and the plane from each other;

a projecting electrode arranged around the optical input-output faces and penetrating through the transparent resin film so as to be connected to the semiconductor device; and a resin loaded in a region around the transparent resin film and in a region around the projecting electrode.

Yet further, according to still another aspect of the present invention, there is provided a method of manufacturing an optical semiconductor module, comprising:

arranging a transparent resin sheet on a plane on which is formed a projecting electrode of an optoelectronic ferrule;

pushing the transparent resin sheet against the plane so as to permit the tip of the projecting electrode to protrude from the transparent resin sheet;

mounting a semiconductor device to the projecting electrode;

inserting an optical guide into a guiding through-hole of the optoelectronic ferrule so as to permit the transparent resin sheet to be pushed against the semiconductor device; and pouring a resin from around the semiconductor device, and solidifying the resin.

BRIEF DESCRIPTION OF THE SEVERAL VIEWS OF THE DRAWING

FIG. 9 is a cross sectional view schematically showing the manufacturing process for explaining a manufacturing method of the optical semiconductor module shown in FIG. 1;

FIG. 10 is a cross sectional view schematically showing the manufacturing process for explaining another manufacturing method of the optical semiconductor module shown in FIG. 1;

FIG. 11 is a cross sectional view schematically showing the manufacturing process for explaining another manufacturing method of the optical semiconductor module shown in FIG. 1;

FIG. 12 is a cross sectional view schematically showing the manufacturing process for explaining another manufacturing method of the optical semiconductor module shown in FIG. 1;

FIG. 20 is a cross sectional view schematically showing the manufacturing process for explaining the manufacturing method of the optical semiconductor module shown in FIG. 16; and FIG. 21 is a cross sectional view schematically showing the manufacturing process for explaining the manufacturing method of the optical semiconductor module shown in FIG. 16.

DETAILED DESCRIPTION OF THE INVENTION

An optical semiconductor module according to each of the embodiments of the present invention and a manufacturing method of the optical semiconductor module will now be described with reference to the accompanying drawings.

Figure 1:
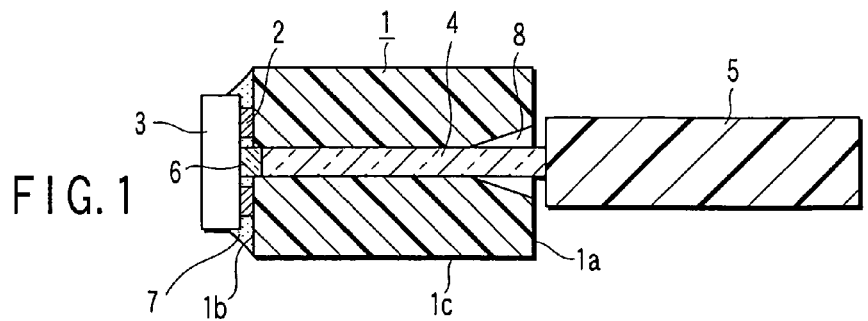
FIG. 1 is a cross sectional view schematically showing the construction of the optical semiconductor module according to the first embodiment of the present invention.

FIG. 1 is a cross sectional view schematically showing the construction of an optical semiconductor module according to a first embodiment of the present invention.

Figure 2:
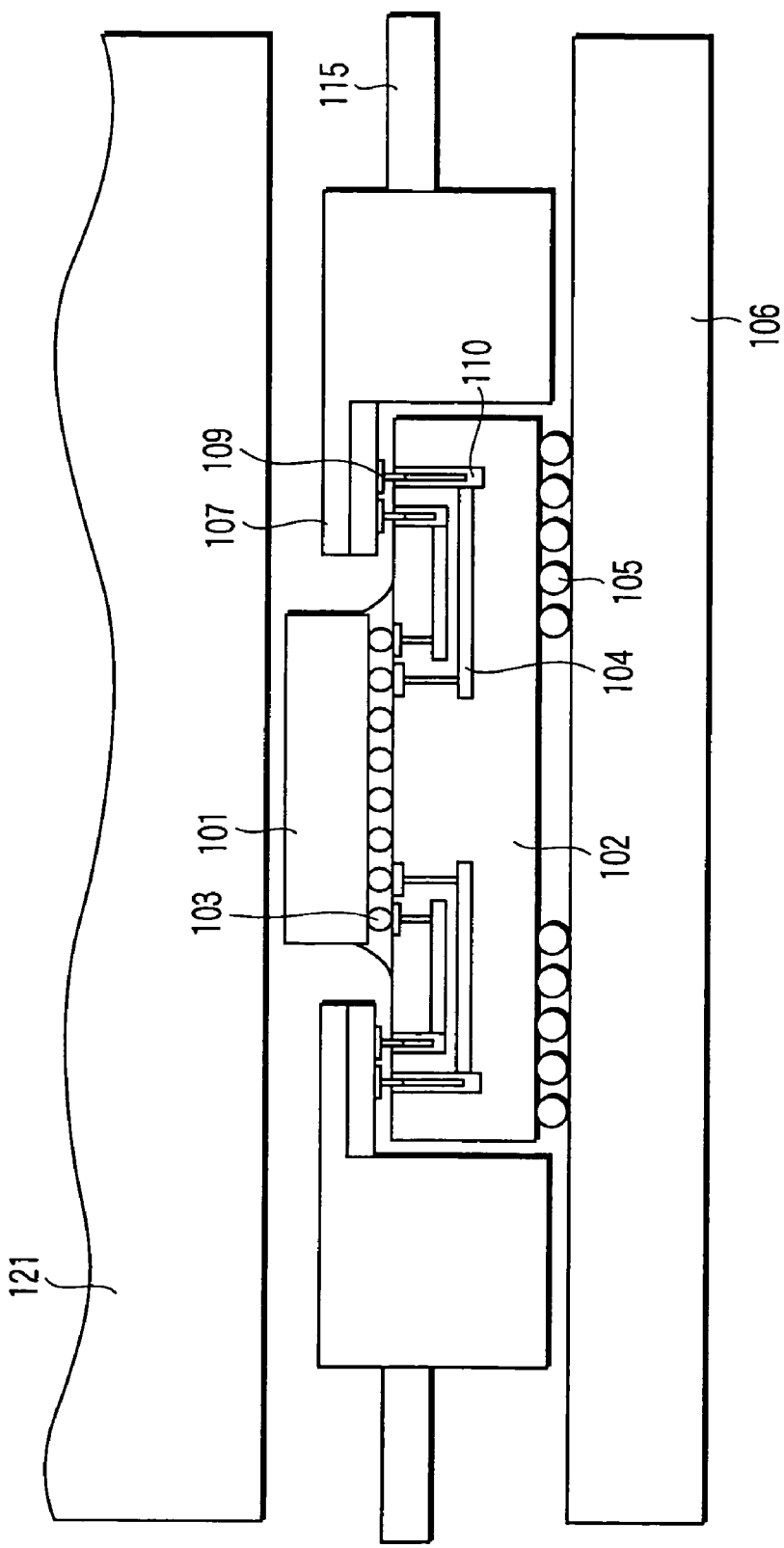
FIG. 2 is a cross sectional view schematically showing the construction of an optical interface module having the optical semiconductor module shown in FIG. 1 incorporated therein.

As shown in FIG. 2, the optical semiconductor module of the present invention shown in FIG. 1 is incorporated in an optical interface module 107. The optical interface module 107 is arranged in a printed circuit board 106. Also, the optical interface module 107 and a semiconductor device or unit such as an LSI package 101 are electrically connected to each other via an interposer 102 to which the LSI package 101 is mounted. Incidentally, reference numerals 103, 105 and 109 denote connection terminals. As shown in the drawing, the printed circuit board 106 is electrically connected to the interposer 102 via the connection terminal 105. Also, the LSI package 101 is electrically connected to the interposer 102 via the connection terminal 103. An optical signal introduced from an external circuit into the optical interface module 107 via an optical guide or fiber 115 is converted into an electric signal and, then, is transmitted to electric wirings 104, 110 arranged within the interposer 102 through the connection terminal 107 and, further, to the LSI package 101 through the electric wirings 104 and 110 noted above. Likewise, the electric signal transmitted from the LSI package 101 is transmitted into the optical interface module 107 through the electric wirings 104, 110 and the connection terminal 109 so as to be converted into an optical signal within the optical interface module 107. The optical signal thus obtained is transmitted to the external circuit through the optical guide 115. A reference numeral 121 shown in FIG. 2 denotes a heat sink for cooling the LSI package 101.

The optical semiconductor module shown in FIG. 1 includes an optoelectronic ferrule 1, which is formed of a material prepared by mixing glass fibers with, for example, an epoxy resin. It is appropriate for the optoelectronic ferrule 1 to have a thickness Ta of 1 to 2 mm and a length Lb of about 2 to 3 mm. A guide hole 8 is formed in the longitudinal direction of the optoelectronic ferrule 1. An optical guide such as an optical fiber 4 is inserted into the guide hole 8 so as to be mechanically held. The optical guide comprises the optical fiber 4 and a protective cover layer 5 for covering and protecting the optical fiber 4. However, the protective cover layer 5 is removed from that portion of the optical fiber 4 which is inserted into the guide hole 8 so as to have the position of the outer shape determined accurately in the inserted portion of the optical fiber 4. Such being the situation, the optical fiber 4 is held bare in the portion inserted into the guide hole 8. The optical signal input-output edge plane of the optical fiber 4 can be obtained by simply cutting the optical fiber 4 with a general optical fiber cutter. To be more specific, it is possible to obtain an optical edge plane of relatively high plane accuracy by simply cutting the optical fiber 4 with a general optical fiber cutter. The optical fiber is not cut by the breakage cutting, but is cut by utilizing the stress cleavage in which the optical fiber is slightly bruised with diamond so as to impart pushing to the side surface. In the optical semiconductor module shown in FIG. 1, the cut surface is used as it is so as to eliminate the manufacturing step of a high cost such as the polishing step. In order to facilitate the insertion of the optical fiber 4, the guide hole 8 is formed such that the diameter of the opening of the guide hole 8 on a certain main plane 1a of the optoelectronic ferrule 1 is made larger than the diameter inside the guide hole 8 as shown in FIG. 1.

Also, a semiconductor device 3 is arranged to face the other main plane or coupling face 1b of the optoelectronic ferrule 1. The semiconductor device 3 is provided with a light-emitting element such as a VCSEL (Vertical Cavity Surface Emitting Laser diodes) or a photo-detecting element such as a PIN-PD (p-i-n photodiode), which is positioned to face the main plane 1b. The active region of the light-emitting element or the photo-detecting element is positioned to face a core (not shown) of the optical fiber 4.

A transparent resin spacer 6 made of, for example, an acrylic resin, a silicone resin or an epoxy resin is interposed between the light-emitting element or the photo-detecting element and the edge plane of the optical fiber 4. The transparent resin spacer 6 has a thickness of, for example, 50 μm. It is possible for the transparent resin spacer 6 to be formed of a mixture of a plurality of different kinds of resins as far as the resin mixture is uniform. Where the transparent resin spacer 6 is formed of a resin mixture, it is necessary for the component resins to be substantially equal to each other in the light refractive index in order to avoid the irregular reflection of light inside the transparent resin spacer 6.

An electrode pad 2 corresponds to a part of the electric wiring (not shown) arranged to cover the main plane 1b and a side plane 1c of the optoelectronic ferrule 1. The electric wiring (not shown) is connected to an optical element driving IC by means of, for example, a wire bonding within the optical interface module 107. The electric wiring further extends from the optical element driving IC through the internal wiring of the optical interface module 107, the connecting pin 109, the Jack 110 within the interposer 102 and the solder bump 109 so as to be connected to the LSI chip 101 for the signal processing.

A transparent under-fill resin 7 is formed in a manner to load the clearance between the semiconductor device 3 and the optoelectronic ferrule 1. The transparent under-fill resin 7 is loaded in a region around the electrode pad 2 and in a region around the transparent resin spacer 6 so as to reinforce the electrode pad 2 and the transparent resin spacer 6.

Figure 3:
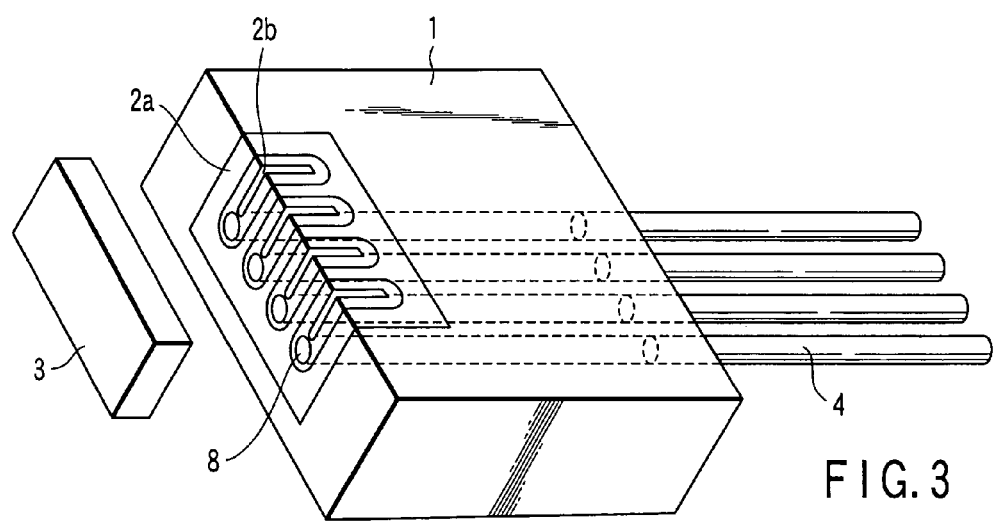
FIG. 3 is an oblique view showing the outer appearance of the entire optical semiconductor module shown in FIG. 1.

FIG. 3 is an oblique view showing the outer appearance of the entire optical semiconductor module of the present invention shown in FIG. 1. In the optical semiconductor module shown in FIG. 3, four optical fibers are coupled with semiconductor device arrays of four channels. In the optical semiconductor module shown in FIG. 3, an electrode 2a is connected to a common electrode (ground or power source) of the four channel semiconductor device arrays, and an electrode 2b is connected to each of the signal electrodes of semiconductor device within the semiconductor device arrays 3. The electrode 2b is in the form of a wiring that is bent at right angles at a corner of the optoelectronic ferrule 1 between the plane, on which the semiconductor device is mounted, and the adjacent side surface of the optoelectronic ferrule 1. The electrode 2b is withdrawn onto the adjacent side surface of the optoelectronic ferrule 1 so as to connect the electrode 2b to, for example, the optical element driving IC described previously in conjunction with FIG. 2 by, for example, a wire bonding or a flip-chip bonding.

The manufacturing method of the optical semiconductor module shown in FIGS. 1 and 3 will now be described with reference to FIGS. 4 to 9. Those portions shown in FIGS. 4 to 9 which are equal in the produced functions to those of the optical semiconductor module shown in FIGS. 1 and 3 are denoted by the same reference numerals so as to avoid the overlapping description.

Figure 4:
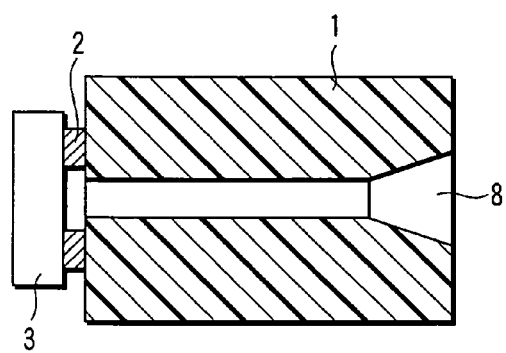
FIG. 4 is a cross sectional view schematically showing the manufacturing process for explaining a manufacturing method of the optical semiconductor module shown in FIG. 1.

In the first step, the optoelectronic ferrule 1 is prepared as shown in FIG. 4. The optoelectronic ferrule 1 is prepared by molding in a mold an epoxy resin mixed with about scores of percent of glass filler having a diameter of about, for example, 30 μm. A pattern is moralized on the optoelectronic ferrule 1 by using a metal mask and, for example, a sputtering process so as to form two electrode pads and an electric wiring. By this forming process, it is possible to manufacture the optoelectronic ferrule 1 on a mass production basis with a very low manufacturing cost while maintaining a very high accuracy, which is not larger than 1 μm. The semiconductor device 3 such as a surface-emitting laser or a photodiode is flip-chip connected to the optoelectronic ferrule 1 by using, for example, a stud bump of Au.

Figure 5:
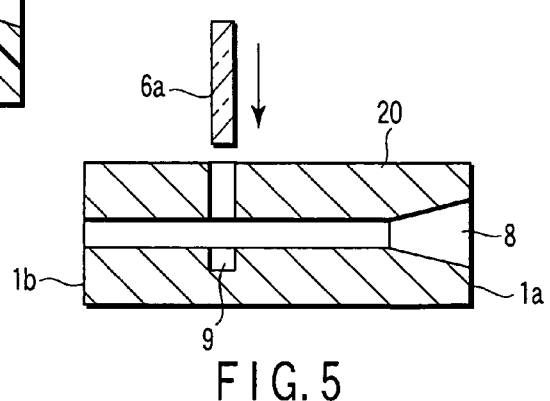
FIG. 5 is a cross sectional view schematically showing the manufacturing process for explaining a manufacturing method of the optical semiconductor module shown in FIG. 1.

A reference numeral 20 shown in FIG. 5 denotes a tool having a guide like the optoelectronic ferrule 1. Since it is possible to use the optoelectronic ferrule 1 as the tool 20, reference numerals similar to those in FIG. 4 are put to FIG. 5. A groove 9 crossing the guide hole 8 is formed in the tool 20, and a transparent resin sheet 6a having a thickness of, for example, 50 μm is inserted into the portion of the groove 9.

Figure 6:
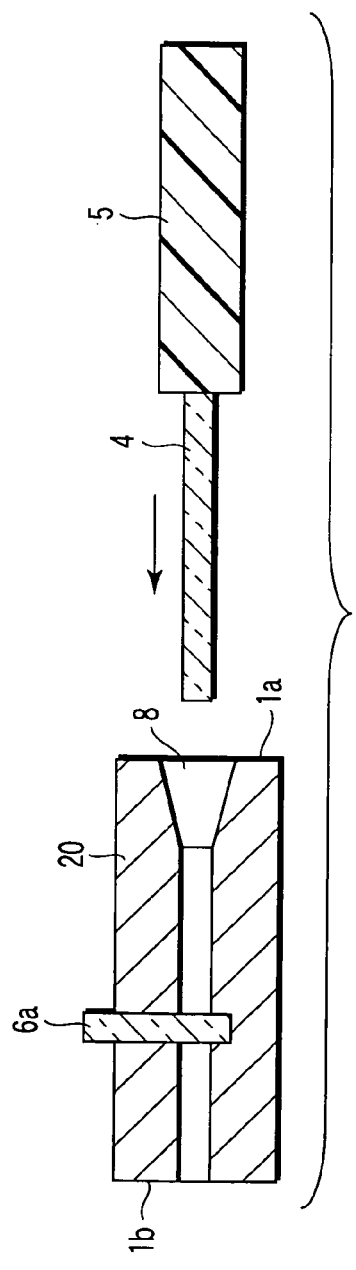
FIG. 6 is a cross sectional view schematically showing the manufacturing process for explaining a manufacturing method of the optical semiconductor module shown in FIG. 1.
Figure 7:
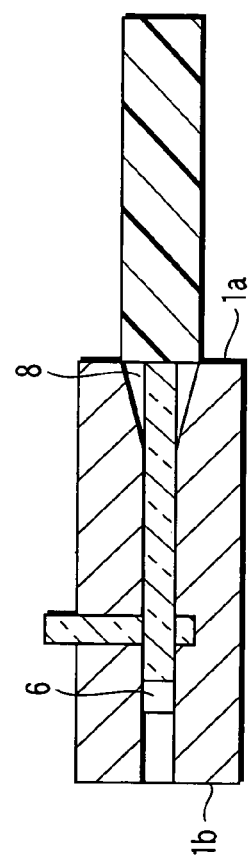
FIG. 7 is a cross sectional view schematically showing the manufacturing process for explaining a manufacturing method of the optical semiconductor module shown in FIG. 1.
Figure 8:
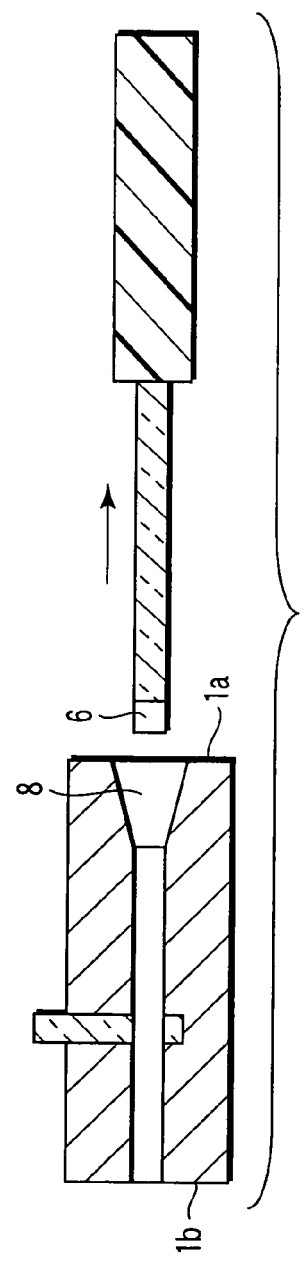
FIG. 8 is a cross sectional view schematically showing the manufacturing process for explaining a manufacturing method of the optical semiconductor module shown in FIG. 1.

In the next step, the optical fiber 4 is inserted into the guide hole 8 under the state that the transparent resin sheet 6a is inserted into the tool 20, and the transparent resin sheet 6a is partly punched out by the pressure given by the optical fiber 4, with the result that the transparent resin spacer 6 is attached to the tip of the optical fiber 4, as shown in FIGS. 6 and 7. Then, the optical fiber 4 having the transparent resin spacer 6 attached thereto is withdrawn from the tool 20. It is advisable to coat in this step the transparent resin sheet 6a or the tip of the optical fiber 4 with a transparent adhesive. In this case, even if the optical fiber 4 is withdrawn, the transparent resin spacer 6 does not fall from the tip of the optical fiber 4, as shown in FIG. 8.

In the next step, a new optoelectronic ferrule 1 is prepared as shown in FIG. 9. Then, the optical fiber 4 having the transparent resin spacer 6 attached thereto is inserted into the guide hole 8 from the main plane 1a of the optoelectronic ferrule 1 until the transparent resin spacer 6 is brought into contact with the semiconductor device 3. If the optical fiber 4 is inserted into the guide hole 8 in this stage with the optoelectronic ferrule 1 held stationary, it is possible for the semiconductor device to be pushed so as to peel from the two electrode pad portions. In order to prevent the difficulty, it is advisable to avoid the fixing of the optoelectronic ferrule 1. To be more specific, it is advisable to arrange an abutting plate on the plane opposite to the optical semiconductor-forming plane of the semiconductor device 3 so as to permit the semiconductor device 3 and the transparent resin spacer 6 to be sandwiched between the optical fiber and the abutting plate. It should also be noted in this connection that the semiconductor device is brittle in general. Therefore, in order to prevent a high pressure from being applied to the semiconductor device, it is advisable to monitor the repulsive pressure of the optical fiber so as to stop the pushing of the optical fiber at the position where the repulsive pressure noted above is slightly increased. The term "repulsive pressure" referred to above implies the force for the resistance to the pushing of the optical fiber 4 toward the semiconductor device 3. It follows that it suffices to set a range within which the transparent resin spacer 6 is elastically deformed so as not to apply an undesirable degree of pressure to the semiconductor device as the range within which the repulsive pressure is slightly increased.

Finally, a liquid transparent resin is poured from the side surface having the semiconductor device 3 mounted thereto so as to form the transparent under-fill resin layer 7. In this stage, it is also possible to pour the liquid transparent resin from the main surface 1a of the guide hole 8 or through a resin pouring port (not shown) formed on the side surface of the optoelectronic ferrule 1 for forming the transparent under-fill resin layer 7. It is possible to use a transparent resin such as an acrylic resin, a silicone resin or an epoxy resin for forming the transparent under-fill resin layer 7. Also, it is effective to use a transparent resin of the type that is cured by the heating or by the irradiation with an ultraviolet light. Further, in order to prevent an excessive scattering loss of light, it is desirable to use a resin having an appropriate refractive index after the curing for forming the transparent under-fill resin layer 7. To be more specific, the refractive index of the resin after the curing should desirably be substantially equal to that of the transparent resin spacer 6.

The manufacturing method of the optical semiconductor module according to the third embodiment of the present invention will now be described with reference to FIGS. 10 to 12.

As shown in FIG. 10, a groove 29 for the resin pouring is formed on a side surface 21c of an optoelectronic ferrule 21. An semiconductor device 23 is mounted to the main plane 21b of the optoelectronic ferrule 21 such that the open portion of the guide hole 28 on the main plane 21b is positioned to face the semiconductor device 23. After the semiconductor device 23 is mounted to the optoelectronic ferrule 21, the transparent resin spacer 6b that is processed in a granular form is poured into the groove 29.

Then, the transparent under-fill resin 7 is poured from the resin-pouring open port so as to be mixed with the transparent resin spacer 26b poured in advance. Incidentally, in the manufacturing method according to the third embodiment of the present invention, the transparent under-fill resin 7 is poured after the pouring of the transparent resin spacer 26b into the groove 29. However, it is also possible to mix in advance the transparent resin spacer 26b with the transparent under-fill resin 7 before, for example, the transparent resin spacer 26b is poured into the groove 29. Also, it is possible for the transparent resin spacer 26b that is processed in the granular form to be in the form of balls of 5 μmφ made of a transparent resin and having a diameter of, for example, 5 μm.

Finally, the optical fiber 24 is inserted into the guide hole 28, as shown in FIG. 12. In this step, the transparent resin spacer 26b is pushed toward the semiconductor device 23 together with the transparent under-fill resin 27. As a result, the tip of the optical fiber 24 is positioned very close to the semiconductor device 23. However, the transparent resin spacer 26b is stopped at a distance intermediate between the tip of the optical fiber 24 and the semiconductor device 23. It follows that, since the transparent resin balls are held between the semiconductor device 23 and the optical fiber 24, it is possible to secure a distance of about 5 µm between the semiconductor device 23 and the optical signal input-output edge surface of the optical fiber 24. Since the extra transparent resin balls are pushed outside the mounting space of the optical element, it is possible to secure a distance of 5 µm to 10 µm between the semiconductor device 23 and the main plane 21b of the optoelectronic ferrule 21.

According to this embodiment, it is possible to omit the step of forming the transparent resin spacer on the tip of the optical fiber and the step of individually inserting the optical fiber into the guide, though these steps are required in the embodiment described previously. It follows that, if this embodiment is employed in the case where the optical fiber has a large core diameter or in the case of the coupling with a photo-detecting element, this embodiment is advantageous in that the through-put of the manufacturing process steps is high and, thus, is effective for the cost reduction.

The manufacturing method of the optical semiconductor module according to still another embodiment of the present invention will now be described with reference to FIGS. 13 to 15.

Figure 13:
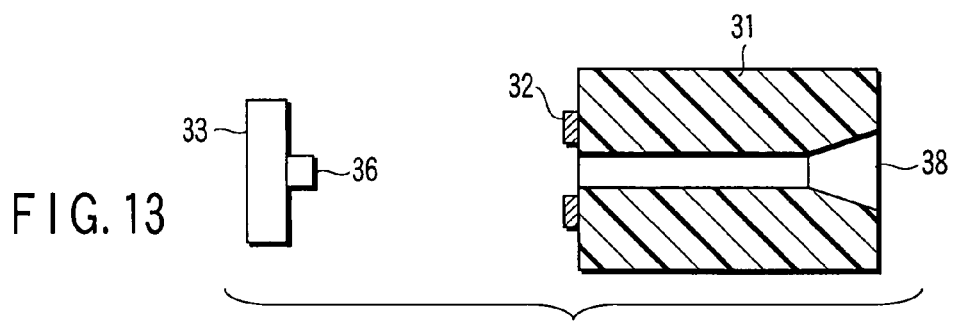
FIG. 13 is a cross sectional view schematically showing the manufacturing process for explaining still another manufacturing method of the optical semiconductor module shown in FIG. 1.

In this embodiment, an active region (not shown) of a semiconductor device 33 is formed in advance on a transparent resin spacer 36, as shown in FIG. 13. The transparent resin spacer 36 is formed by the coating of, for example, a transparent polyimide resin or a transparent silicone resin in a thickness of 50 µm by, for example, a spin coating method, followed by removing the undesired portion of the coated resin layer by, for example, a photo-etching method, with a region of, for example, 80 µmφ above the active region left unremoved. It is possible to form the transparent resin spacer 36 in a manner to cover the entire region except the electrode pad (not shown) of the semiconductor device.

Figure 14:
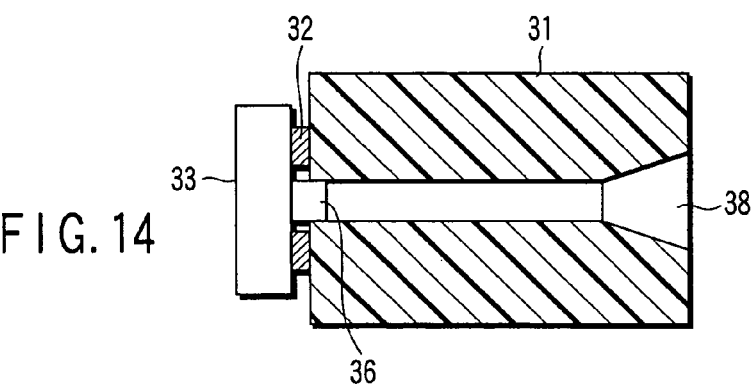
FIG. 14 is a cross sectional view schematically showing the manufacturing process for explaining still another manufacturing method of the optical semiconductor module shown in FIG. 1.
Figure 15:
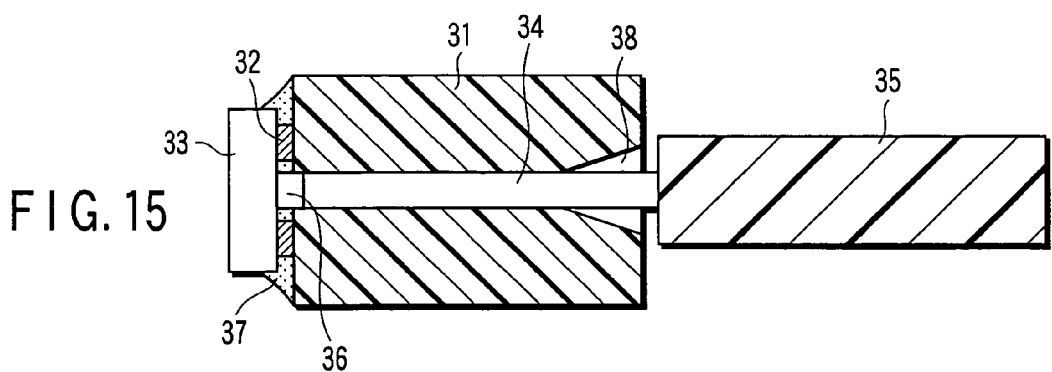
FIG. 15 is a cross sectional view schematically showing the manufacturing process for explaining still another manufacturing method of the optical semiconductor module shown in FIG. 1.

In the next step, the residue, etc. on the electrode on the surface of the semiconductor device 33 is removed, followed by performing a flip-chip connection of the semiconductor device 33 to the optoelectronic ferrule 1 by using, for example, an Au stud bump, as shown in FIG. 14. Needless to say, the semiconductor device 33 is mounted to the optoelectronic ferrule 1 with the active region of the semiconductor device 33 aligned with the guide hole of the optical fiber.

Finally, the optical fiber is inserted from the rear portion of the optoelectronic ferrule 31 and pushed until the transparent resin spacer 36 is brought into contact with the input-output plane of the optical fiber. If the optical fiber 4 is inserted in this stage into a guide hole 38 under the state that the optoelectronic ferrule 31 held stationary, it is possible for the semiconductor device 33 to be pushed so as to peel from the two electrode pad portions. In order to prevent the difficulty, it is advisable to avoid the fixation of the optoelectronic ferrule 31. To be more specific, it is advisable to arrange an abutting plate on the plane opposite to the optical semiconductor-forming plane of the semiconductor device 33 so as to permit the semiconductor device 33 and the transparent resin spacer 36 to be sandwiched between the optical fiber and the abutting plate. It should also be noted in this connection that the semiconductor device is brittle in general. Therefore, in order to prevent a high pressure from being applied to the semiconductor device 33, it is advisable to monitor the repulsive pressure of the optical fiber so as to stop the pushing of the optical fiber at the position where the repulsive pressure noted above is slightly increased. The term "repulsive pressure" referred to above implies the force for the resistance to the pushing of the optical fiber 4 toward the semiconductor device 33. It follows that it suffices to set a range within which the transparent resin spacer 36 is elastically deformed so as not to apply an undesirable degree of pressure to the semiconductor device 33 as the range within which the repulsive pressure is slightly increased.

In the next step, a liquid transparent resin is poured from the side surface having the semiconductor device 33 mounted thereto so as to form a transparent under-fill resin layer 37. In this stage, it is also possible to pour the liquid transparent resin from the main surface la of the guide hole 38 or through a resin pouring port (not shown) formed on the side surface of the optoelectronic ferrule 31 for forming the transparent under-fill resin layer 7. It is possible to use a transparent resin such as an acrylic resin, a silicone resin or an epoxy resin for forming the transparent under-fill resin layer 37. Also, it is effective to use a transparent resin of the type that is cured by the heating or by the irradiation with an ultraviolet light. Further, in order to prevent an excessive scattering loss of light, it is desirable to use a resin having an appropriate refractive index after the curing for forming the transparent under-fill resin layer 37. To be more specific, the refractive index of the resin after the curing should desirably be substantially equal to that of the transparent resin spacer 36.

In the optical semiconductor module and the manufacturing method of the optical semiconductor module according to the embodiments of the present invention described above, it is possible to manufacture the optical semiconductor module having a high reproducibility with a high yield. In addition, it is possible to improve the productivity. It follows that it is possible to achieve the wiring between the high speed chips of LSIs with a low cost so as to make it possible to contribute to the promotion in the grade of, for example, the information communicating apparatus.

The optical semiconductor module according to still another embodiment of the present invention and the manufacturing method thereof will now be described.

In the optical semiconductor module according to this embodiment of the present invention, the polishing is not performed by fixing the optical transmission path such as an optical fiber to a holding member. In this embodiment, the cleaved surface of an optical fiber or the edge surface of an optical waveguide formed by the collective etching of a wafer is used as it is for the optical coupling with the semiconductor device. Also, a transparent resin spacer is inserted into an optical path so as to control the distance between the semiconductor device and the edge surface of the optical transmitting path.

Figure 16:
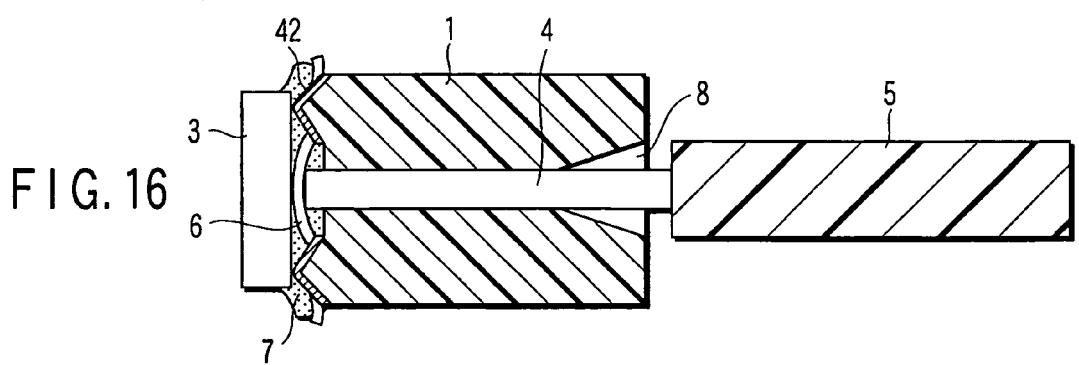
FIG. 16 is a cross sectional view schematically showing the construction of an optical semiconductor module according to the second embodiment of the present invention.

FIG. 16 is a cross sectional view schematically showing the construction of an optical semiconductor module according to this embodiment of the present invention. The reference numerals shown in FIG. 16 are substantially equal to those shown in FIG. 1. To be more specific, the optical semiconductor module shown in FIG. 16 comprises an optoelectronic ferrule 1, a semiconductor device 3, an optical fiber 4, a protective cover layer 5 of the optical fiber, a transparent resin spacer 6, a transparent under-fill resin 7, and a guide hole 8 through which extends the optical transmitting path including, for example, an optical fiber and an optical waveguide film.

As shown in FIG. 16, an electric wiring or a projecting electrode 42 is formed of a support body constituting a main body forming the projection and an electrode section. The electrode section 42 is of a laminate structure consisting of a plurality of layers formed of, for example, Au, Pt and Ti. The projecting electrode 42 is not limited to the particular construction. For example, it is possible to use a silver paste for forming both the support body and the electrode section.

Figure 17:
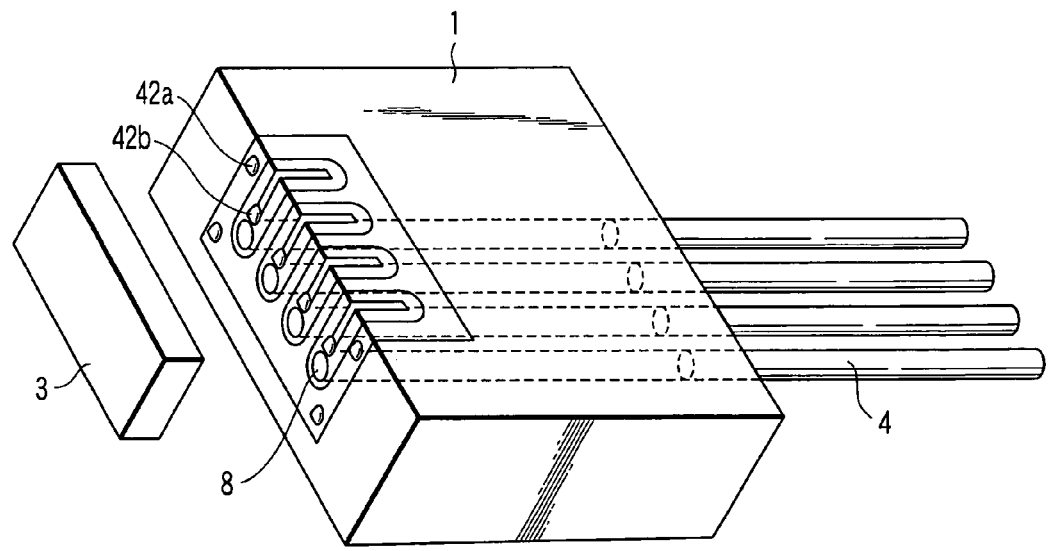
FIG. 17 is an oblique view schematically showing the outer appearance of the entire optical semiconductor module shown in FIG. 16.

FIG. 17 is an oblique view schematically showing the outer appearance of the entire optical semiconductor module shown in FIG. 16. In this optical semiconductor module, four optical fibers are coupled with 4-channel semiconductor device arrays. A reference numeral 42a shown in FIG. 17 denotes a common electrode (ground or power source) of the 4-channel arrays, and a reference numeral 42b denotes a signal electrode for each semiconductor device. As shown in the drawing, the signal electrode 42b is bent at right angles from the plane of the optoelectronic ferrule 1 on which is mounted the semiconductor device 3 semiconductor device to the adjacent side surface of the optoelectronic ferrule 1. The signal electrode 42b is withdrawn onto the adjacent side surface of the optoelectronic ferrule 1 in order to permit the signal electrode 42b to be connected to, for example, the driving IC of the semiconductor device 3 by means of, for example, the wire bonding or the flip-chip bonding.

The manufacturing method of the optical semiconductor module shown in FIG. 16 will now be described with reference to FIGS. 18 to 21.

FIGS. 18 to 21 are cross sectional views schematically showing the manufacturing process of the optical semiconductor module shown in FIG. 16. The optoelectronic ferrule 1 is formed by molding in a mold an epoxy resin mixed-with about 80% of glass filler having a diameter of about 30 μm. A hole for the bare optical fibber or a projecting section of the projecting electrode is formed in the optoelectronic ferrule 1, and the projecting electrode 42 and the electric wiring are formed by means of a patterned metallization that is carried out by, for example, a sputtering method using a metal mask. Because of the particular manufacturing process, the optoelectronic ferrule 1 can be manufactured on a mass production basis with a very low manufacturing cost while maintaining a very high accuracy of 1 μm or less.

Figure 18:
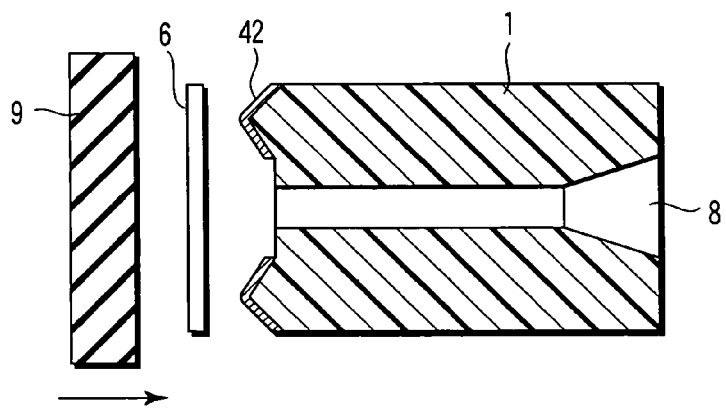
FIG. 18 is a cross sectional view schematically showing the manufacturing process for explaining the manufacturing method of the optical semiconductor module shown in FIG. 16.
Figure 19:
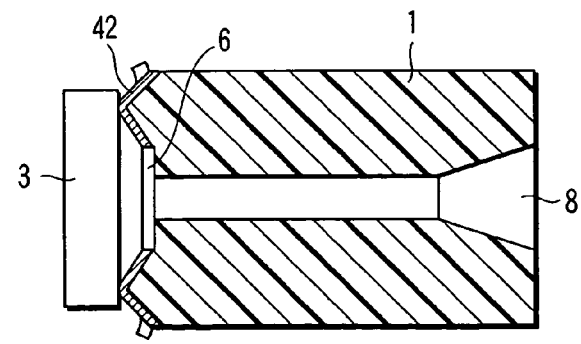
FIG. 19 is a cross sectional view schematically showing the manufacturing process for explaining the manufacturing method of the optical semiconductor module shown in FIG. 16.

As shown in FIG. 18, a transparent resin sheet (spacer) 6 formed of, for example, an acrylic resin, a silicone resin or an epoxy resin is mounted to the optoelectronic ferrule 1, and an abutting plate 9 such as a rubber plate is pushed against the transparent resin sheet (spacer) 6 so as to permit the tip of the projecting electrode 42 to protrude from the transparent resin sheet 6. Then, a semiconductor device 3 such as a surface-emitting laser or a photodiode is mounted to the projecting electrode 42 by the flip-chip bonding method, as shown in FIG. 19. Further, the optical fiber 4 is inserted into the guide hole so as to push the optical fiber until the transparent resin spacer 6 is brought into contact with the semiconductor device 3, as shown in FIG. 20. If the optical fiber 4 is inserted in this stage into the guide hole 8 under the state the optoelectronic ferrule 1 is held stationary, it is possible for the semiconductor device 3 to be pushed so as to peel from the electrode pad portions. In order to prevent the difficulty, it is advisable to avoid the fixing of the optoelectronic ferrule 1. To be more specific, it is advisable to arrange an abutting plate behind the semiconductor device 3 so as to permit the semiconductor device 3 and the transparent resin spacer 6 to be supported such that the semiconductor device 3 and the transparent resin spacer 6 are sandwiched between the optical fiber 4 and the abutting plate. It should also be noted in this connection that the semiconductor device 3 is brittle in general. Therefore, in order to prevent a high pressure from being applied to the semiconductor device 3, it is advisable to monitor the repulsive pressure of the optical fiber 4 so as to stop the pushing of the optical fiber 4 at the position where the repulsive pressure noted above is slightly increased. It suffices to set a range within which the transparent resin spacer 6 is elastically deformed so as not to apply an undesirable degree of pressure to the semiconductor device 3 as the range within which the repulsive pressure is slightly increased.

An optical edge plane having a relatively high planar accuracy can be obtained by simply cutting the optical fiber 4 with a general optical fiber cutter. It should be noted in this connection that the optical fiber is not cut by the breakage cutting, but is cut by utilizing the stress cleavage in which the optical fiber is slightly bruised with diamond so as to impart pushing to the side surface. In the optical semiconductor module of the present invention, the cut surface is used as it is so as to eliminate the manufacturing process step of a high cost such as the polishing step.

Finally, a transparent liquid resin is poured from the side surface on which is mounted the semiconductor device 3 so as to form an under-fill 7 layer, as shown in FIG. 21. It is possible to pour the transparent under-fill resin from the rear portion of the guide hole 8 or from a resin pouring port (not shown) formed in the side surface of the optoelectronic ferrule 1. It is possible to use a transparent resin such as an acrylic resin, a silicone resin or an epoxy resin as the transparent under-fill resin 7. Also, the pouring operation can be carried out efficiently in the case of using a transparent resin that can be cured by the heating or upon irradiation with an ultraviolet light. Also, it is desirable for the refractive index of the transparent resin after the curing to be as close as possible to that of the transparent resin spacer 6 in the aspect of preventing an excessive scattering loss.

The present invention is not limited to each of the embodiments described above. For example, it is possible to use various other resins such as a polyimide resin or a polycarbonate resin for forming the transparent resin spacer and the transparent under-fill resin. It is also possible to use a quartz series optical fiber or a plastic series optical fiber. Further, it is possible to use an optical waveguide film in place of the optical fiber.

According to the optical semiconductor module of each of the embodiments described above and the manufacturing method thereof, the construction of the optical semiconductor module is highly simplified so as to suppress the material cost to the minimum level, and a small optical semiconductor module of a high performance can be manufactured on a mass production basis. It follows that it is possible to achieve the wiring between the high speed chips of LSI s with a low cost so as to make it possible to contribute to the promotion in the grade of, for example, the information communicating apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical semiconductor module, comprising:
   an optical guide having an optical coupling end, the optical guide being configured to guide an optical signal;
   an optoelectronic ferrule having a coupling face, provided with electrode pads on the coupling face and a guiding through-hole having an opening on the coupling face, in which the optical guide is inserted;

a semiconductor device arranged to face the coupling face with a gap, and electrically coupled to the electrode pads, the semiconductor device including a light emitting or light detecting section facing to the optical coupling end;

a first resin layer located in the gap between the light emitting or light detecting section and the optical coupling end, the first resin layer optically coupling the light emitting or light detecting section to the optical coupling end;

a second resin layer applied to the gap around the first resin layer; and a groove formed in the optoelectronic ferrule and communicated with the guiding through-hole.

2. The optical semiconductor module according to claim 1, wherein the first resin layer is formed of a granular transparent resin.

3. The optical semiconductor module according to claim 1, wherein the optoelectronic ferrule has another face opposing to the coupling face, and the guiding through-hole includes first and second hole sections, the second hole section being communicated with the first hole, being larger than the first hole section, and being opened on the another face opposing to the coupling face.

4. An optical semiconductor module, comprising:

optical guides each having an optical coupling end and being configured to guide an optical signal:

an optoelectronic ferrule having a coupling face, provided with electrode pads on the coupling face and guiding through-holes each having an opening on the coupling face, in which the optical guides are inserted, respectively:

a semiconductor device arranged to face the coupling face with a gap, and electrically coupled to the electrode pads, the semiconductor device including light emitting or light detecting sections facing to the optical coupling ends, respectively:

first resin segments each located in the gap between the light emitting or light detecting section and the optical coupling ends, respectively, each of the first resin segments optically coupling the light emitting or light detecting section to the optical coupling end;

a second resin layer applied to the gap around the first resin segments: and grooves formed in the optoelectronic ferrule and communicated with the guiding through-holes, respectively.

5. The optical semiconductor module according to claim 4, wherein the first resin segment is formed of a granular transparent resin.

6. The optical semiconductor module according to claim 4, wherein the optoelectronic ferrule has another face opposing to the coupling face, and each of the guiding through-hole includes first and second hole sections, the second hole section being communicated with the first hole section, being larger than the first hole section, and being opened on the face opposing to the coupling face.

7. An optical semiconductor module, comprising:

an optical guide having an optical coupling end, the optical guide being configured to guide an optical signal;

an optoelectronic ferrule having a coupling face, provided with electrode pads on the coupling face and a guiding through-hole having an opening on the coupling face, in which the optical guide is inserted;

a semiconductor device arranged to face the coupling face with a gap, and electrically coupled to the electrode pads, the semiconductor device including a light emitting or light detecting section facing to the optical coupling end;

a granular first resin layer located in the gap between the light emitting or light detecting section and the optical coupling end, the first resin layer optically coupling the light emitting or light detecting section to the optical coupling end;

a second resin layer applied to the gap around the first resin layer; and a groove formed in the optoelectronic ferrule and communicated with the guiding through-hole.

8. The optical semiconductor module according to claim 7, wherein the optoelectronic ferrule has another face opposing to the coupling face, and the guiding through-hole includes first and second hole sections, the second hole section being communicated with the first hole, being larger than the first hole section, and being opened on the face opposing to the coupling face.

9. A method of manufacturing an optical semiconductor module, comprising:

loading a first transparent resin in a groove formed in a tool that is shaped like an optoelectronic ferrule;

inserting an optical guide into a through-hole crossing the first groove and punching the first transparent resin at the tip end of the optical guide;

withdrawing the optical guide having the punched first resin tip mounted to the optical guide from the through-hole; and inserting the optical guide into a guiding through-hole formed in the optoelectronic ferrule so as to permit the optical guide to abut against a semiconductor device mounted on coupling face of the optoelectronic ferrule.

10. A method of manufacturing an optical semiconductor module, comprising:

mixing a solid or semi-solid granular first transparent resin with a liquid second transparent resin, pouring the resultant mixture into a guiding through-hole of an optoelectronic ferrule;

inserting an optical guide into a guiding through-hole of the optoelectronic ferrule so as to bring the mixture into contact with a tip end of the optical guide and with a semiconductor device mounted to an coupling face of the optoelectronic ferrule; and solidifying the second transparent resin.

11. A method of manufacturing an optical semiconductor module, comprising:

arranging a transparent resin sheet on a plane on which is formed a projecting electrode of an optoelectronic ferrule;

pushing the transparent resin sheet against the plane so as to permit the tip of the projecting electrode to protrude from the transparent resin sheet;

mounting a semiconductor device to the projecting electrode;

inserting an optical guide into a guiding through-hole of the optoelectronic ferrule so as to permit the transparent resin sheet to be pushed against the semiconductor device; and pouring a resin from around the semiconductor device, and solidifying the resin.

12. The method of manufacturing an optical semiconductor module according to claim 11, wherein the arranging the transparent resin sheet includes arranging a rubber plate on the transparent resin sheet, and pushing the transparent resin sheet includes pushing the rubber plate.

* * * * *